March 26, 1935.  F. V. DONALD  1,995,842
POWER LAWN MOWER
Filed Aug. 11, 1934
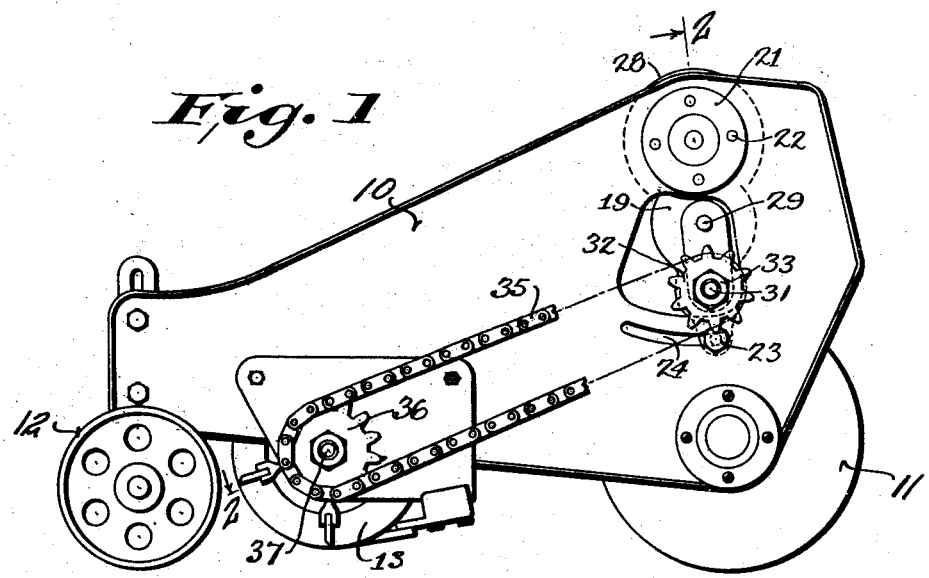
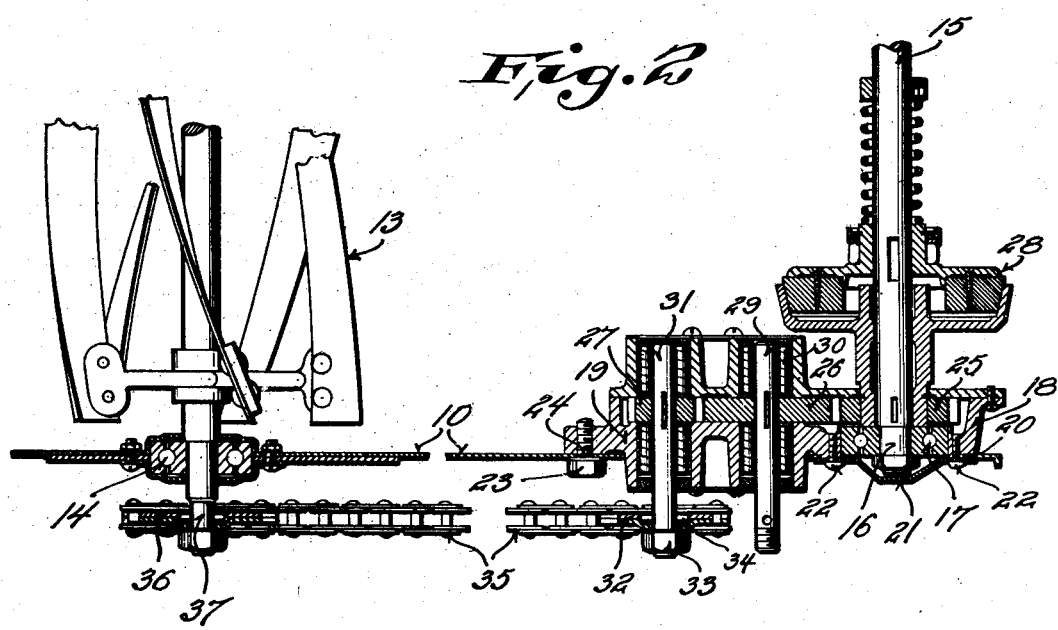
Inventor
FORREST V. DONALD
By
Attorney Patented Mar. 26, 1935

1,995,842

UNITED STATES PATENT OFFICE 1,995,842

POWER LAWN MOWER

Forrest V. Donald, Milwaukee, Wis., assignor to Cooper Manufacturing Company, Marshalltown, Iowa, a corporation of Iowa Refiled for application Serial No. 511,690, January 28, 1931. This application August 11, 1934, Serial No. 739,450

3 Claims. (Cl. 56—26)

This application is a refiled application of application Serial No. 511,690, filed January 28, 1931.

This invention relates to power lawn mowers and particularly to cutter reel drives therefor.

One object of the present invention is the provision of a simple inexpensive drive for the cutter reels of power lawn mowers so constructed and arranged as to afford a prompt and ready change in reel speed.

Another object is the provision in a power lawn mower of a cutter reel drive which may be readily adjusted to effect rotation of the reel in a reverse direction and at an appropriate speed for sharpening.

Other objects and advantages of the invention will appear from the following description of an illustrative embodiment thereof.

In the accompanying drawing:

Figure 1 is a view in side elevation of a power lawn mower constructed in accordance with the present invention.

Fig. 2 is a sectional view on the line 2—2 of Fig. 1.

The lawn mower shown comprises a main frame, including a pair of side plates, one of which is shown at 10, mounted upon a rear traction roller 11 and upon a pair of front wheels, one of which is shown at 12. The cutter reel 13 is journaled in appropriate anti-friction bearings, one of which is shown at 14, mounted in the side plates 10 of the frame. The traction roller 11 is driven through appropriate mechanism from a power shaft 15, which is driven through appropriate mechanism from an internal combustion engine carried by the frame.

The cutter reel 13 is also driven at different speeds and in either direction from the power shaft 15 through the novel mechanism which will now be described. In this instance one end 16 of the power shaft 15 is supported by an appropriate anti-friction bearing 17, seated within a hollow circular boss 18 formed adjacent one end of an auxiliary frame 19. The boss 18 is shouldered, as indicated at 20, and is rotatably seated within a circular opening formed in the side plate 10, and retained in position therein by a dished circular cover plate 21, removably fixed to the boss 18 by the screws 22 and bearing against the face of the side plate 10. The arrangement is such that the auxiliary frame 19 may be swung through a limited angle about the axis of the power shaft 15 and secured in adjusted position by appropriate means such as a screw 23 projecting through an arcuate slot 24 in the side plate 10 and threaded into the opposite end of the auxiliary frame.

The auxiliary frame 19 carries a train of gears 25, 26 and 27. Gear 25 is driven from the power shaft 15 through an appropriate clutch 28 under the control of the operator. The intermediate gear 26, driven by gear 25, is fixed to a supporting shaft 29, journaled in anti-friction bearings 30 in the auxiliary frame and projecting beyond the frame. Gear 27, driven by gear 26, is somewhat smaller than gear 26 and consequently rotates at higher speed and in the opposite direction. Gear 27 is fixed to a supporting shaft 31 journaled in the same manner as shaft 29 and also projecting beyond the auxiliary frame. A sprocket wheel 32 removably fixed to the end of shaft 31 by appropriate means, such as a nut 33 and pin 34, is operatively connected, through a sprocket chain 35, with a sprocket wheel 36, removably fixed to the end 37 of the cutter reel shaft. The wheel 36 is of a size different from that of wheel 32, so that by removal and interchange thereof upon the shafts 31 and 37 the rate of operation of the cutter reel may be varied to suit the condition of the turf.

When sharpening of the cutter reel becomes necessary, this may be accomplished by transferring the sprocket wheel 32 to the shaft 29, such transfer being facilitated by releasing the screw 23 and swinging the auxiliary frame in such direction as to release the chain and to position the shaft 29 at a distance from the shaft 37 equal to that normally assumed by the shaft 31. With the wheel 32 thus transferred to shaft 29, the cutter reel is reversely driven at a slower speed appropriate for sharpening. In carrying out the sharpening process the cutter bar is set close to the reel with an appropriate grinding compound applied thereto and when reversely driven in the manner described the reel sharpens itself within a few minutes.

It will thus be noted that by the combination and arrangement hereinabove described, it is possible to obtain two reel speeds in one direction for normal cutting and reverse operation of the reel for sharpening. By reason of the adjustability of the frame 19 it is possible to employ sprocket wheels of different sizes for the purpose of obtaining other reel speeds best suited for any given condition of turf.

Various changes may be made in the embodiment of the invention hereinabove described without departing from or sacrificing the advantages of the invention as defined in the appended claims.

I claim:—

1. In a power lawn mower the combination of a mobile supporting frame, a cutter reel, a shaft in said frame for supporting and driving said reel, a driving sprocket removably fixed to said shaft, a power shaft, a member adjustably mounted to swing about the axis of said power shaft, a sprocket wheel removably carried by said member, a plurality of intermeshing driving gears between said power shaft and said last named sprocket wheel, and a sprocket chain forming a driving connection between said sprocket wheels, said sprocket wheels being of different sizes and being interchangeable to vary the speed ratio between said power shaft and said first named shaft.

2. In a power lawn mower the combination of a mobile supporting frame, a cutter reel carried thereby, a sprocket wheel for driving said reel, a power shaft, a member rockably supported at one end in said frame, a power shaft journaled at one end in said member for rotation about an axis coincident with the rocking axis of said member, a second sprocket wheel removably carried by said member, a plurality of intermeshing driving gears connecting said power shaft and said second sprocket wheel, and a sprocket chain forming a driving connection between said sprocket wheels.

3. In a power lawn mower the combination of a mobile supporting frame, a cutter reel carried thereby, a sprocket wheel for driving said reel, a power shaft, a member adjustably mounted to swing about the axis of said power shaft, a pair of oppositely rotating gears on said member driven by said power shaft, a second sprocket wheel connectable to either of said gears selectively to effect operation thereof in either direction, and a sprocket chain forming a driving connection between said sprocket wheels.

FORREST V. DONALD.